United States Patent
Tiirola et al.

(10) Patent No.: US 8,553,636 B2
(45) Date of Patent: Oct. 8, 2013

(54) CHANNEL SELECTION FOR CARRIER AGGREGATION

(75) Inventors: Esa Tapani Tiirola, Kempele (FI); Kari Pekka Pajukoski, Oulu (FI); Timo Erkki Lunttila, Espoo (FI)

(73) Assignee: Nokia Siemens Networks Oy, Espoo (FI)

( * ) Notice: Subject to any disclaimer, the term of this patent is extended or adjusted under 35 U.S.C. 154(b) by 198 days.

(21) Appl. No.: 13/210,627

(22) Filed: Aug. 16, 2011

(65) Prior Publication Data

US 2012/0039407 A1    Feb. 16, 2012

Related U.S. Application Data

(60) Provisional application No. 61/374,078, filed on Aug. 16, 2010.

(51) Int. Cl.
*H04W 4/00* (2009.01)

(52) U.S. Cl.
USPC .......................................................... 370/329

(58) Field of Classification Search
USPC .................. 370/329–330, 335–337, 340–348
See application file for complete search history.

(56) References Cited

U.S. PATENT DOCUMENTS

| | | | |
|---|---|---|---|
| 2009/0109917 A1 | 4/2009 | Pajukoski et al. | |
| 2011/0141878 A1* | 6/2011 | Che et al. | 370/216 |
| 2011/0205994 A1* | 8/2011 | Han et al. | 370/329 |
| 2012/0039275 A1* | 2/2012 | Chen et al. | 370/329 |
| 2012/0236771 A1* | 9/2012 | Luo et al. | 370/311 |
| 2012/0263121 A1* | 10/2012 | Chen et al. | 370/329 |
| 2012/0281645 A1* | 11/2012 | Li et al. | 370/329 |
| 2012/0294273 A1* | 11/2012 | Ahn et al. | 370/329 |
| 2012/0327875 A1* | 12/2012 | Han et al. | 370/329 |
| 2013/0100919 A1* | 4/2013 | Han et al. | 370/329 |
| 2013/0107852 A1* | 5/2013 | Han et al. | 370/329 |

OTHER PUBLICATIONS

Berggren and Jianghua, "Channel Selection HARQ Feedback in LTE-Advanced", IEEE 2012, pp. 1-6.*
3GPP TSG RAN WG1 #54, R1-083125, Texas Instrument, "Performance of Multi-bit ACK/NAK Transmission in TDD", South Korea, Aug. 18-22, 2008, pp. 1-3.
3GPP TSG-RAN WG2 Meeting #69bis, R2-101986, Nokia Siemens Networks, Nokia Corporation, "Timing and HARQ Feedback Errors with Activation/Deactivation", Beijing, China, Apr. 12-16, 2010, 4 pages.
3GPP TSG RAN WG1 Meeting #60, R1-101253, Panasonic, "Support of UL ACK/NACK Channel Selection for Carrier Aggregation", San Francisco, USA, Feb. 22-26, 2010, pp. 1-6.

(Continued)

*Primary Examiner* — Thai Hoang
(74) *Attorney, Agent, or Firm* — Squire Sanders (US) LLP

(57) ABSTRACT

Channel selection for LTE-Advanced, or other, carrier aggregation can be performed by a method, apparatus, or computer-readable medium. According to certain embodiments, a method can include determining that channel selection and constellation selection are in use or to be used. The method can also include determining that a single mapping table design for channel selection for up to four bits is in use or to be used. The method can further include selecting a communication resource from resource entries corresponding to acknowledgment and negative acknowledgment states based on the determining that channel selection and constellation selection are in use or to be used and the determining that the single mapping table design for channel selection for up to four bits is in use or to be used.

21 Claims, 3 Drawing Sheets

(56) References Cited

OTHER PUBLICATIONS

3GPP TS 36.213 v8.5.0, Technical Specification, 3rd Generation Partnership Project; Technical Specification Group Radio Access Network; Evolved Universal Terrestrial Radio Access (E-UTRA); Physical Layer Procedures (Release 8), Dec. 2008, 74 pages.

3GPP TSG RAN WG1 Meeting #61bis, R1-103506, Ericsson, St-Ericsson, "PUCCH Design for CA", Dresden, Germany, Jun. 28-Jul. 2, 2010, 5 pages.

3GPP TSG-RAN WG1 #61, R1-102612, Ericsson, St-Ericsson, "Evaluation of PUCCH Proposals for Carrier Aggregation," Montreal, Canada, May 10-14, 2010, 10 pages.

Ericsson et al., 3GPP TSG-RAN WG1 #60bis, R1-101730, "PUCCH Design for Carrier Aggregation", Bejing, China Apr. 2010, 4 pages.

Ericsson et al., 3GPP TSG-RAN WG1 #60, R1-100909, "A/N Transmission in the Uplink for Carrier Aggregation", San Francisco, USA, Feb. 2010, 4 pages.

Berardinelli, Gilberto et al., "Link Parameters Bundling Across Multiple Component Carriers in LTE-A Uplink", IEEE Vehicular Technology Conference (VTC 2010-Spring), Taipei, Taiwan, May 16, 2010, XP031696205, 5 pages, ISBN: 978-1-4244-2518-1.

Nokia Siemens Networks et al., 3GPP TSG RAN WG1 Meeting #61 R1-102945, "On the PUCCH Multiplexing Combinations for CA", Montreal, Canada, May 2010, 2 pages.

International Search Report application No. PCT/EP2011/064030 dated Nov. 4, 2011.

\* cited by examiner

CHANNEL SELECTION FOR CARRIER AGGREGATION

CROSS-REFERENCE TO RELATED APPLICATION

This application is related to and claims the priority of U.S. Provisional Patent Application No. 61/374,078, filed Aug. 16, 2010, the entirety of which is hereby incorporated herein by reference.

BACKGROUND

1. Field

Acknowledgments, including affirmative acknowledgments (ACK) and negative acknowledgments (NACK), can be transmitted on a physical uplink control channel (PUCCH). Such acknowledgments relate to one or more codeword transmitted on a physical downlink shared channel (PDSCH) in the case of carrier aggregation. Certain embodiments of the present invention relate to channel selection when carrier aggregation is used.

2. Description of the Related Art

In long term evolution (LTE) release 8 (Rel-8) time division duplexing (TDD), in the case of an asymmetric downlink (DL)/uplink (UL) configuration, the user equipment (UE) has the possibility to report ACK/NACK associated with multiple downlink subframes during one uplink subframe. The ACK/NACK signaling for multiple downlink subframes can be made using either ACK/NACK bundling or ACK/NACK multiplexing mode.

For ACK/NACK bundling mode, the ACK/NACK bits can be first bundled in the time domain to get one bit, or 2 bits with multiple codeword (MCW) downlink transmission. Then the ACK/NACK bits can be modulated and transmitted on the physical uplink control channel corresponding to the last detected downlink grant.

For ACK/NACK multiplexing mode, channel selection can be used. Channel selection enables transmission of 2-4 bits via a single physical uplink control channel. The selected channel and the QPSK constellation point used can be determined based on the ACK/NACK/DTX states for the multiple downlink subframes as shown in Table 10.1-2, 10.1-3, and 10.1-4 of 3GPP TS36.213 v850.

SUMMARY

According to certain embodiments, a method includes determining that channel selection and constellation selection are in use or to be used. The method also includes determining that a single mapping table design for channel selection for up to four bits is in use or to be used, wherein the mapping table for n+1 acknowledgment, negative acknowledgment and/or discontinuous transmission bits includes the entries in the table for n acknowledgment, negative acknowledgment and/or discontinuous transmission bits, where n is an integer number of bits from 1 to 3. The method further includes selecting a communication resource from resource entries corresponding to acknowledgment and negative acknowledgment states based on the determining that channel selection and constellation selection are in use or to be used and the determining that the single mapping table design for channel selection for up to four bits is in use or to be used.

According to further embodiments, an apparatus includes at least one memory including computer program code and at least one processor. The at least one memory and the computer program code are configured to, with the at least one processor, cause the apparatus at least to determine that channel selection and constellation selection are in use or to be used. The at least one memory and the computer program code are also configured to, with the at least one processor, cause the apparatus at least to determine that a single mapping table design for channel selection for up to four bits is in use or to be used, wherein the mapping table for n+1 acknowledgment, negative acknowledgment and/or discontinuous transmission bits includes the entries in the table for n acknowledgment, negative acknowledgment and/or discontinuous transmission bits, where n is an integer number of bits from 1 to 3. The at least one memory and the computer program code are further configured to, with the at least one processor, cause the apparatus at least to select a communication resource from resource entries corresponding to acknowledgment and negative acknowledgment states based on the determination that channel selection and constellation selection are in use or to be used and the determination that the single mapping table design for channel selection for up to four bits is in use or to be used.

According to certain embodiments an apparatus includes determining means for determining that channel selection and constellation selection are in use or to be used. The apparatus also includes determining means for determining that a single mapping table design for channel selection for up to four bits is in use or to be used, wherein the mapping table for n+1 acknowledgment, negative acknowledgment and/or discontinuous transmission bits includes the entries in the table for n acknowledgment, negative acknowledgment and/or discontinuous transmission bits, where n is an integer number of bits from 1 to 3. The apparatus further includes selecting means for selecting a communication resource from resource entries corresponding to acknowledgment and negative acknowledgment states based on the determining that channel selection and constellation selection are in use or to be used and the determining that the single mapping table design for channel selection for up to four bits is in use or to be used.

A computer readable medium (such as a storage medium or non-transitory medium) according to certain embodiments is encoded with instructions that, when executed in hardware, perform a process. The process includes determining that channel selection and constellation selection are in use or to be used. The process also includes determining that a single mapping table design for channel selection for up to four bits is in use or to be used, wherein the mapping table for n+1 acknowledgment, negative acknowledgment and/or discontinuous transmission bits includes the entries in the table for n acknowledgment, negative acknowledgment and/or discontinuous transmission bits, where n is an integer number of bits from 1 to 3. The process further includes selecting a communication resource from resource entries corresponding to acknowledgment and negative acknowledgment states based on the determining that channel selection and constellation selection are in use or to be used and the determining that the single mapping table design for channel selection for up to four bits is in use or to be used.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Figure 1:
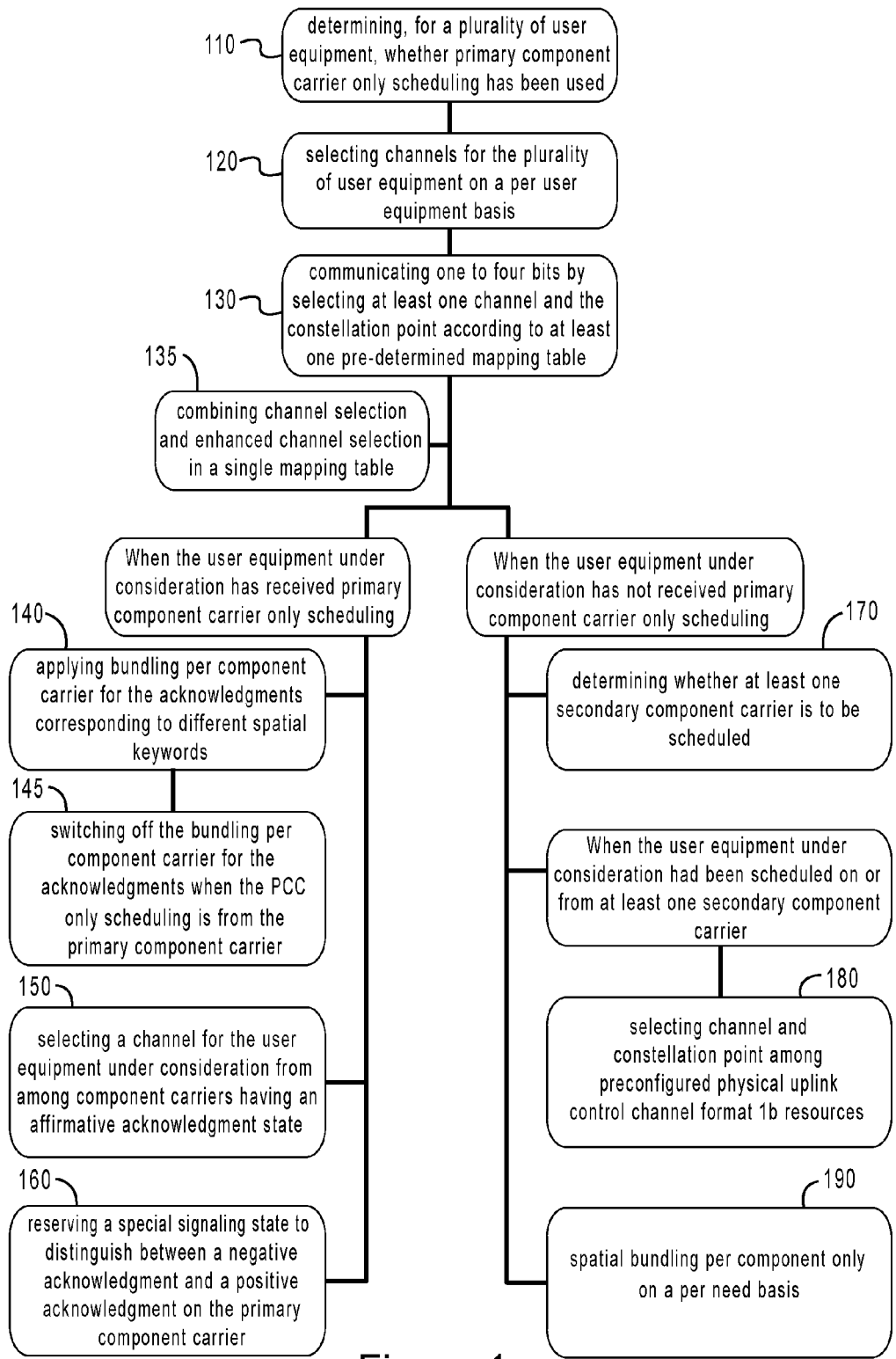
FIG. 1 illustrates a method according to certain embodiments of the present invention.

Certain embodiments of the present invention provide detailed channel selection possibilities applicable to, for example, LTE-Advanced channel selection. At least solutions can be employed: a solution in the case of implicit resource allocation and a solution in the case of hybrid resource allocation. The solution in the case of hybrid resource allocation can combine channel selection and enhanced channel selection in a single mapping table. It should be noted that explicit resource allocation can also be supported with both solutions.

Arranging channel selection in carrier aggregation, such as LTE-Advanced carrier aggregation, can be performed various ways. A straightforward application of TDD channel selection is one option. In this approach, a Rel-8 TDD solution is applied such that TDD subframes are counted as component carriers. However, existing Rel-8 TDD based channel selection design cannot provide full separation between ACK and NACK in all cases. The issue of full separation between ACK and NACK in such cases can be addressed by means of a channel selection table. The channel selection table, however, may be sub-optimal in the case of primary component carrier (PCC) only scheduling. Primary component carrier only scheduling may refer to the situation in which only a primary component carrier has been scheduled.

The Rel-8 TDD-based solution may have a separate mapping table for the cases of two, three, and four bits. It should be noted that there can be timing uncertainty involved in component carrier (re-)configuration, particularly in the case of physical uplink control channel selection. In order to avoid this timing uncertainty, the same multiplexing mapping table can be applied regardless of the number of downlink component carriers (CCs) configured.

Table 1, below, illustrates channel selection according to Rel-8/9 TDD.

TABLE 1

| PCC | SCC | | | PUCCH A/N resource (h#) | Data |
|---|---|---|---|---|---|
| b0 | b1 | b2 | b3 | RS&Data | Const. |
| D | D | D | D | DTX | |
| N | D | D | D | h0 | j |

TABLE 1-continued

| PCC | SCC | | | PUCCH A/N resource (h#) | Data |
|---|---|---|---|---|---|
| b0 | b1 | b2 | b3 | RS&Data | Const. |
| A | N/D | N/D | N/D | h0 | −1 |
| N/D | A | N/D | N/D | h1 | −j |
| A | A | N/D | N/D | h1 | j |
| N/D | N/D | A | N/D | h2 | 1 |
| A | N/D | A | N/D | h2 | −j |
| N/D | A | A | N/D | h2 | j |
| A | A | A | N/D | h1 | j |
| N/D | N/D | N/D | A | h3 | 1 |
| A | N/D | N/D | A | h0 | −j |
| N/D | A | N/D | A | h3 | j |
| A | A | N/D | A | h1 | j |
| N/D | N/D | A | A | h3 | −j |
| A | N/D | A | A | h3 | −j |
| N/D | A | A | A | h3 | −j |
| A | A | A | A | h1 | −1 |
| N/D | N/D | N/D | N | h3 | −1 |
| N/D | N/D | N | D | h2 | −1 |
| N/D | N | D | D | h1 | 1 |

Certain embodiments of the present invention may differ from the straightforward application of TDD channel selection. For example, there may be two different ACK/NACK signaling scenarios that are addressed and two different solutions for the two different scenarios.

In a first scenario, which may be a typical carrier aggregation scenario, downlink scheduling can take place from both primary component carrier and secondary component carrier (SCC). In a second scenario, which may be a special case, carrier indicator field (CIF)-assisted cross-component-carrier scheduling may take place from primary component carrier only. Separate channel selection solutions may be applied to each of these scenarios, thereby optimizing an overall solution covering both cases.

In the optimized overall solution, the solution to be applied can be configured in a user-equipment-specific manner. Thus, both solutions for the two situations can be utilized as a combination, and/or as separate channel selection solutions.

TABLE 2

Rel-8 TDD, modified.

| PCC | SCC | | | PUCCH A/N resource (h#) | Data |
|---|---|---|---|---|---|
| b0 | b1 | b2 | b3 | RS&Data | Const. |
| D | N/D | N/D | N/D | DT | |
| N | N/D | N/D | N/D | 0 | 1 |
| A | N/D | N/D | N/D | h0 | −1 |
| N/D | A | N/D | N/D | h1 | −i |
| A | A | N/D | N/D | h1 | i |
| N/D | N/D | A | N/D | h2 | 1 |
| A | N/D | A | N/D | h2 | i |
| N/D | A | A | N/D | h2 | −i |
| A | A | A | N/D | h2 | −1 |
| N/D | N/D | N/D | A | h3 | 1 |
| A | N/D | N/D | A | h0 | −i |
| N/D | A | N/D | A | h3 | i |
| A | A | N/D | A | h0 | i |
| N/D | N/D | A | A | h3 | −i |
| A | N/D | A | A | h3 | −1 |
| N/D | A | A | A | h1 | 1 |
| A | A | A | A | h1 | −1 |

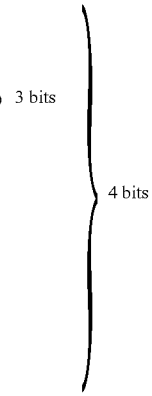

D = DTX,
A = ACK,
N = NACK

An embodiment of a solution for the special case is shown in Table 2, above. This is just one example, as it is possible to rotate the data constellations within the resource (e.g., h1). This embodiment is just one example of a solution for the special case in which carrier-indicator-field-assisted cross-component-carrier scheduling may take place from primary component carrier only. The solution, in this example, can be characterized as follows. Bundling is applied per component carrier for the ACK/NACKs corresponding to different spatial codewords. Thus, for example, where there are 2 spatial codewords on a component carrier, a logical AND operation is performed to obtain the value of bundled ACK/NACK.

Additionally, in this example, a single design is applicable to 1-4 bits. The selected channel (h#) is selected among the component carriers with ACK ('A') state. If ACK is signaled for component carriers #2 and #3, the physical uplink control channel can be selected among h2 and h3. In the example of Table 2, h3 is shown as selected. ACK being signaled for component carriers #2 and #3 is just one example.

Furthermore, in this example, a special signaling state is reserved to NACK or DTX, for example [N, N/D, N/D, . . . ], helping to distinguish between NACK and DTX on the primary component carrier. This simply means that there are separate signaling states reserved for NACK and DTX on the primary component carrier when there is no scheduling on any of the secondary component carriers. For example, in Table 3 below, the first row of the PCC only section corresponds to discontinuous transmission (DTX) on the primary component carrier, while the second row indicates a NACK on the primary component carrier. When some secondary component carriers are scheduled as well (in addition to the primary component carriers), however, there is no distinction between DTX and NACK, as shown in the Table (DTX and NACK share the same resource). When an evolved node B (eNB) makes the physical downlink shared channel scheduling for the primary component carrier only, then it has only three signaling states to be considered (1) DTX, (2) [N, D, D, D] and (3) [A, D, D, D]. Taking the proposed constellation points into account, for the eNB this reservation can provide operation similar to Rel-8 in the case of primary component carrier only scheduling.

TABLE 3

Enhanced channel selection.

|  | PCC | SCC | | | PUCCH A/N resource (h#) | | Dat |
|---|---|---|---|---|---|---|---|
|  | b | b | b | b | RS | Dat | Const |
| PCC | D | D | D | D | DT | | DT | Rel-8 operation |
|  | NN | D | D | D | h0 (=r0, d0) | | 1 |
|  | NA | D | D | D | h | | — |
|  | AN | D | D | D | h | | i |
|  | AA | D | D | D | h | | — |
| PCC + SCCo SCC | N/ | N/ | N/ | N/ | h | | 1 | Channel selection |
|  | A | N/ | N/ | N/ | h | | i |
|  | N/ | A | N/ | N/ | h | | — |
|  | A | A | N/ | N/ | h | | — |
|  | N/ | N/ | A | N/ | h | | 1 |
|  | A | N/ | A | N/ | h | | i |
|  | N/ | A | A | N/ | h | | — |
|  | A | A | A | N/ | h | | — |
|  | N/ | N/ | N/ | A | r | d | 1 | Enhanced channel selection (2 PUCCH format 1b resources) |
|  | A | N/ | N/ | A | r | d | i |
|  | N/ | A | N/ | A | r | d | — |
|  | A | A | N/ | A | r | d | — |
|  | N/ | N/ | A | A | r | d | 1 |
|  | A | N/ | A | A | r | d | i |
|  | N/ | A | A | A | r | d | — |
|  | A | A | A | A | r | d | — |

D = DTX,
A = ACK,
N = NACK

An embodiment of a solution for a typical carrier aggregation scenario is shown in Table 3, above. Like the previous example embodiment, this embodiment is also simply an example. It is possible to rotate the data constellations within the resource (e.g., h1). Furthermore, there are no problems with changing the constellation and channel selection entries within the explicitly configured multi-A/N resource (h1, h2, . . . ). Although this channel selection table has been optimized for hybrid resource allocation, it is always possible to use this channel selection table with explicit resource allocation.

This example of a solution for the typical carrier aggregation scenario can be characterized as follows. A physical uplink control channel Format 1a/1b resource according to Rel-8 is applied in the case of primary component carrier only scheduling. Channel and constellation point selection among pre-configured physical uplink control channel format 1b resources takes place in the case where the user equipment receives a scheduling grant corresponding to at least one secondary component carrier. Spatial bundling per component carrier is applied only on a per need basis. Furthermore, spatial bundling is applied according to higher layer configuration or other pre-definition. This example solution combines channel selection and enhanced channel selection in a single table. More specifically, this example solution utilizes ordinary channel selection when there are up to 2 secondary component carriers (or 3 bits) and enhanced channel selection when there are 3 secondary component carriers (or 4 bits).

A common feature of the two solutions is that they are based on a single design, the single design being applicable to 1-4 bits. Optimization criteria, however, differ between the two scenarios. The solution illustrated in Table 2 has been optimized for carrier-indicator-field-based cross-componentcarrier scheduling from the primary component carrier. The solution can also be applied with other implicit resource allocation schemes as well. Furthermore, the solution can be applied with explicit resource allocation. Thus, this solution may be fully compatible with the implicit resource allocation. A 3-bit carrier indicator field can be included in a resource allocation grant.

The solution illustrated by Table 3, on the other hand, has been optimized for a typical carrier aggregation (CA) scenario with scheduling from both primary component carrier and secondary component carrier. This solution can support both hybrid and explicit resource allocation, and consequently physical uplink control channel overhead can be minimized. A Rel-8/9 implicit resource allocation scheme can be applied for physical uplink control channel format 1a/1b resources corresponding to the primary component carrier and scheduled via the primary component carrier. Other physical uplink control channel format 1b resources, if needed, can be reserved explicitly via higher layer signaling.

Also, this example solution supports Rel-8/9 type of signaling in the case of primary component carrier only scheduling. Increased physical uplink control channel overhead can be experienced with explicit RA, since that multi-A/N resources are reserved semi-statically to those UEs configured for carrier aggregation. It is noted that resource reservation issue is relaxed significantly if multi-A/N resource is used only in the case A/N signalling relates to one or more SCCs (PCC only scheduling utilizes Rel-8 A/N resource on the PUCCH). This will allow sharing the same multi-A/N resource among multiple UEs on PUCCH.

Furthermore, this solution supports 2-bit ACK/NACK feedback in the case of primary component carrier only scheduling. Moreover, this solution has, in this example, built in support for various carrier aggregation combinations with and w/o spatial bundling (2+1, 2+1+1, 2+2, 1+1+1+1 ACK/NACK bits per component carrier). The expression, 2+1+1, corresponds to the case with 3-component carriers: one component carrier with 2-bit ACK/NACK, and 2 component carrier with 1-bit ACK/NACK.

The solution, an example of which is shown in table 3, permits extension to 36 states on Multi-ACK/NACK resource to be made using three resources. Furthermore, enhanced DTX-to-NACK separation can be provided using this solution, although such enhanced separation may require a separate mapping table.

In view of the above, in certain embodiments, a multi-ACK/NACK resource on the physical uplink control channel is used only in the case ACK/NACK signaling relates to one or more secondary component carriers. Likewise, in certain embodiments, a single ACK/NACK multiplexing mapping table is applied regardless of the number of downlink component carriers configured.

Advantages of certain embodiments of the present invention include the fact that there may be small additional complexity on top of Rel-8 operation, that the combined solution may support both carrier aggregation scenarios, and physical uplink control channel overhead can be minimized in all scenarios.

FIG. 1 illustrates a method according to certain embodiments of the present invention. The method, as illustrated, includes determining 110, for a plurality of user equipment, whether primary component carrier only scheduling has been used. If an eNB makes primary component carrier and secondary component carrier scheduling for a user equipment, but the resource allocation grant corresponding to the secondary component carrier fails, then the user equipment can consider this scheduling as primary component carrier only scheduling. Thus, there can be one determining at the eNB and one another determining at the UE. Moreover, the eNB can make the scheduling decision (i.e., whether to schedule physical downlink shared channel on the primary component carrier and/or one or more secondary component carrier). This scheduling decision can be signaled to the user equipment via the physical downlink control channel, although signaling is subject to errors. Then, the user equipment can feed back the ACK/NACK/DTX corresponding to the received physical downlink shared channels by means of the proposed channel selection tables.

The method also includes selecting 120 channels for the plurality of user equipment on a per user equipment basis. The selection of the channels is performed on a per user equipment basis depending on whether the user equipment under consideration has received primary component carrier only scheduling.

The method can further include communicating 130 one to four bits by selecting at least one channel and the constellation point according to at least one pre-determined mapping table. This aspect of the method can be performed regardless of whether the user equipment under consideration has received primary component carrier only scheduling.

The method can further include combining 135 channel selection and enhanced channel selection in a single mapping table.

When the user equipment under consideration has received primary component carrier only scheduling, the method can include applying 140 bundling per component carrier for the acknowledgments (broadly including both ACK and NACK as types of acknowledgments) corresponding to different spatial codewords.

When the user equipment under consideration has received primary component carrier only scheduling from primary component carrier, the method can include switching off 145 bundling per component carrier for the acknowledgments (broadly including both ACK and NACK as types of acknowledgments) corresponding to different spatial codewords.

When the user equipment under consideration has received primary component carrier only scheduling, the method can include selecting 150 a channel for the user equipment under consideration from among component carriers having an affirmative acknowledgment state.

When the user equipment under consideration has received primary component carrier only scheduling, the method can include reserving 160 a special signaling state to distinguish between a negative acknowledgment and a positive acknowledgement on the primary component carrier.

When the user equipment under consideration has not received primary component carrier only scheduling, the method can include determining 170 whether at least one secondary component carrier has been scheduled.

When the user equipment under consideration has been scheduled on or from at least one secondary component carrier, the method can include selecting 180 channel and constellation point among preconfigured physical uplink control channel format 1b resources. It should be noted that primary component carrier only scheduling from a secondary component carrier can create the same functionality, as explained above with reference to Table 3.

When the user equipment under consideration has not received primary component carrier only scheduling from the primary component carrier, the method can include spatial bundling 190 per component carrier only on a per need basis.

The method illustrated in FIG. 1 may be variously implemented. For example, the method of FIG. 1 may be implemented completely in hardware. Alternatively, a computer readable medium, such as a storage medium or non-transitory medium, can be encoded with instructions that, when executed in hardware, perform the method of FIG. 1, or some part of the method shown there. Other steps not illustrated in FIG. 1 may also be performed by the execution of the instructions. The method of FIG. 1 may be performed by a user equipment or by some other network element.

Figure 2:
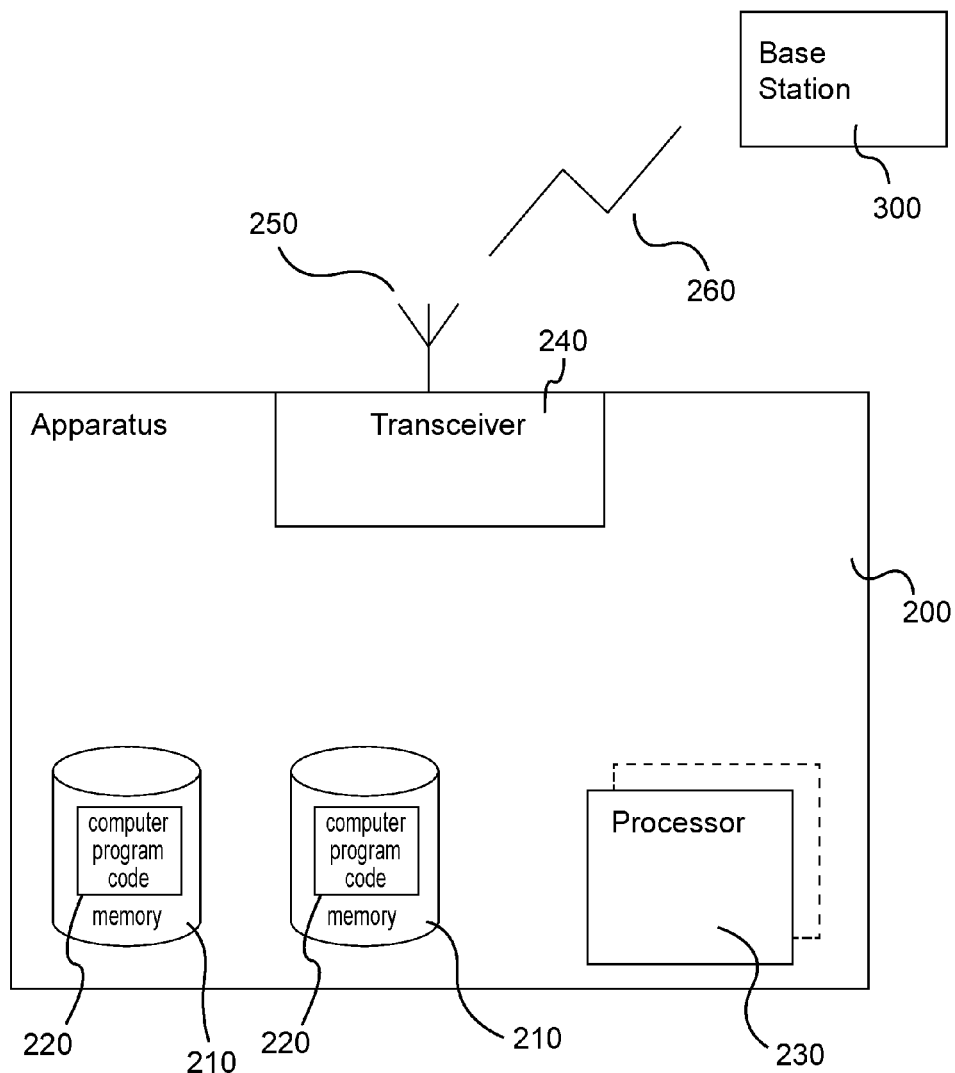
FIG. 2 illustrates an apparatus according to certain embodiments of the present invention.

FIG. 2 illustrates an apparatus according to certain embodiments of the present invention. The apparatus 200 of FIG. 2 includes at least one memory 210, including computer program code 220. The apparatus 200 may be, for example, a user equipment, such as a mobile phone, personal digital assistant, or personal computer. There is no requirement that the apparatus be this specific network element, and other network elements in the communication system may perform the same functions or a distributed portion of the functions. The memory 210 may be any storage device, such as random access memory (RAM), read only memory (ROM), hard disk drive, or electronically programmable ROM (EPROM). The computer program code 220 may be a any suitable set of computer program instructions. For example, the computer instructions may be in a compiled format or in an interpreted format.

The apparatus 200 may also include at least one processor 230. The processor 230 may be any suitable processing device, such as a controller, a central processing unit (CPU), or an application specific integrated circuit (ASIC). The processor 230 may be as a blade in a rack-mounted computer system in one embodiment.

The at least one memory 210 and the computer program code 220 can be configured to, with the at least one processor 230, cause the apparatus 200 at least to determine, for a plurality of user equipment, whether primary component carrier only scheduling has been used and select channels for the plurality of user equipment on a per user equipment basis. Selection of the channels can be performed on the per user equipment basis depending on whether the user equipment under consideration has received primary component carrier only scheduling.

The at least one memory 210 and the computer program code 220 can be configured to, with the at least one processor 230, cause the apparatus 200 at least to communicate one to four bits by selecting at least one channel and the constellation point according to at least one pre-determined mapping table.

The at least one memory 210 and the computer program code 220 can be configured to, with the at least one processor 230, cause the apparatus 200 at least to combine channel selection and enhanced channel selection in a single mapping table.

When the user equipment under consideration has received primary component carrier only scheduling, the at least one memory 210 and the computer program code 220 can be configured to, with the at least one processor 230, cause the apparatus 200 at least to apply bundling per component carrier for the acknowledgments (broadly including both ACK and NACK as types of acknowledgments) corresponding to different spatial codewords.

When the user equipment under consideration has received primary component carrier only scheduling, the at least one memory 210 and the computer program code 220 can be configured to, with the at least one processor 230, cause the apparatus 200 at least to switch off bundling per component carrier for the acknowledgments (broadly including both ACK and NACK as types of acknowledgments) corresponding to different spatial codewords When the user equipment under consideration has received primary component carrier only scheduling, the at least one memory 210 and the computer program code 220 can be configured to, with the at least one processor 230, cause the apparatus 200 at least to select a channel for the user equipment under consideration from among component carriers having an affirmative acknowledgment state.

When the user equipment under consideration has received primary component carrier only scheduling, the at least one memory 210 and the computer program code 220 can be configured to, with the at least one processor 230, cause the apparatus 200 at least to reserve a special signaling state to distinguish between a negative acknowledgment and a positive acknowledgment on the primary component carrier.

When the user equipment under consideration has not received primary component carrier only scheduling, the at least one memory 210 and the computer program code 220 can be configured to, with the at least one processor 230, cause the apparatus 200 at least to determine whether at least one secondary component carrier has been scheduled.

When the user equipment under consideration has been scheduled on or from at least one secondary component carrier, the at least one memory 210 and the computer program code 220 can be configured to, with the at least one processor 230, cause the apparatus 200 at least to select channel and constellation point among preconfigured physical uplink control channel format 1b resources.

When the user equipment under consideration has not received primary component carrier only scheduling from the primary component carrier, the at least one memory 210 and the computer program code 220 can be configured to, with the at least one processor 230, cause the apparatus 200 at least to spatial bundle per component carrier only on a per need basis.

The apparatus 200 may also include other features, such as transceiver 240 and an antenna 250. The antenna 250 may be configured to communicate with a base station 300 over a wireless link 260.

The base station 300, such as a base station, enhanced Node B (eNB), or other access point, may have a similar construction to the apparatus 200. Additionally, the base station 300 may also be configured to communicate with a core network, not shown.

Figure 3:
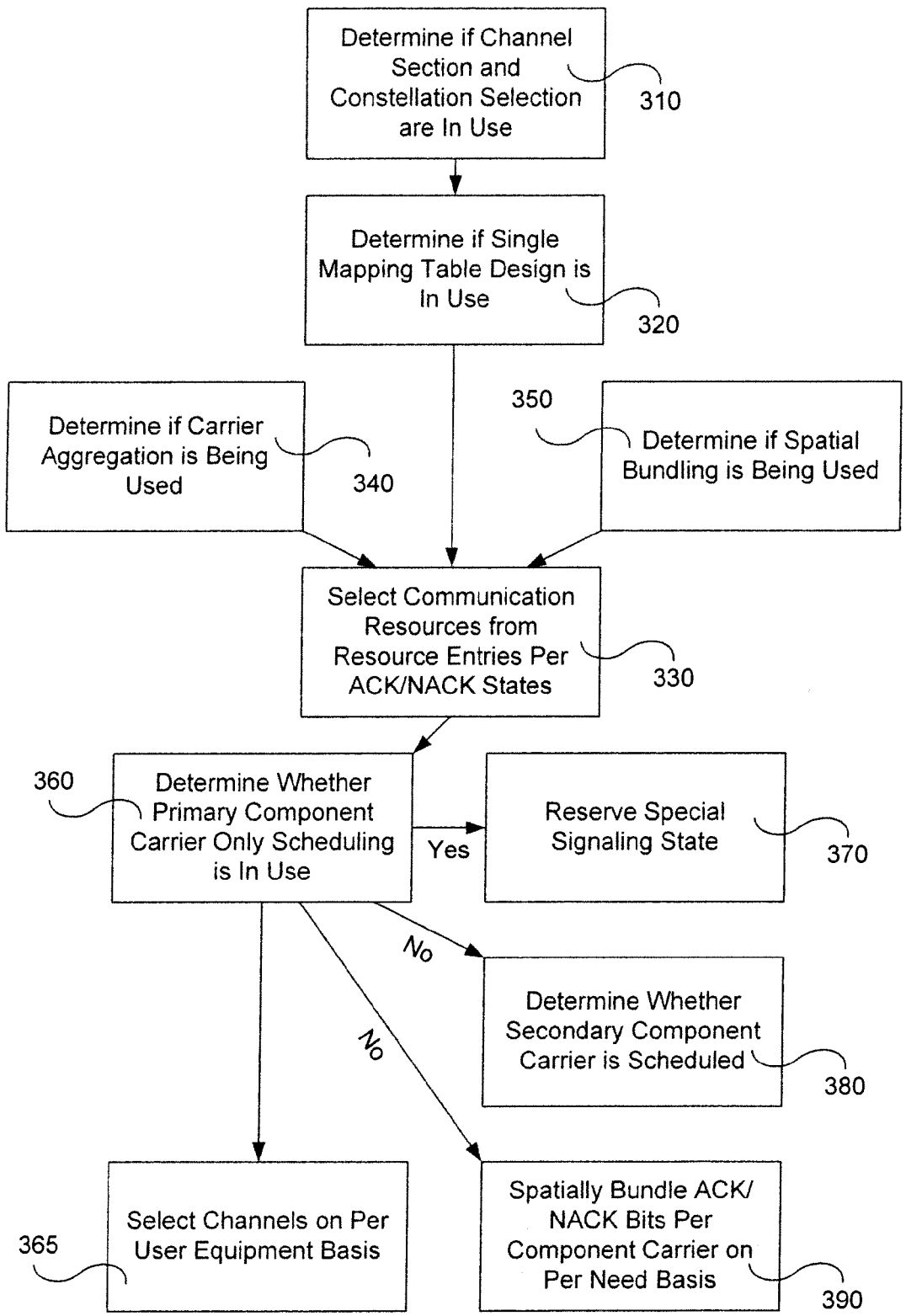
FIG. 3 illustrates a method according to certain embodiments of the present invention.

FIG. 3 illustrates a method according to certain embodiments of the present invention. As shown in FIG. 3, a method can include, at 310, determining that channel selection and constellation selection are in use or to be used. The method can also include, at 320, determining that a single mapping table design for channel selection for up to four bits is in use or to be used, wherein the mapping table for n+1 acknowledgment, negative acknowledgment and/or discontinuous transmission bits includes the entries in the table for n acknowledgment, negative acknowledgment and/or discontinuous transmission bits, where n is an integer number of bits from 1 to 3. The method can further include, at 330, selecting a communication resource from resource entries corresponding to acknowledgment and negative acknowledgment states based on the determining that channel selection and constellation selection are in use or to be used and the determining that the single mapping table design for channel selection for up to four bits is in use or to be used.

The method can additionally include, at 340, determining that carrier aggregation is in use or to be used. The selecting the communication resource can be further based on the determining that carrier aggregation is in use or to be used.

The method can also include, at 350, determining that spatial bundling of acknowledgement and negative acknowledgement bits for the first and second codeword is in use or to be used. The selecting the communication resource can be further based on the determining that carrier aggregation is in use or to be used.

The method can further include, at 360, determining, for a plurality of user equipment, whether primary component carrier only scheduling has been used, and, at 365, selecting channels for the plurality of user equipment on a per user equipment basis. The selection of the channels can be performed on the per user equipment basis depending on whether the user equipment under consideration has received primary component carrier only scheduling.

When the user equipment under consideration has received primary component carrier only scheduling, the method can include, at 370, reserving a special signaling state to distinguish between a negative acknowledgment and discontinuous transmission on the primary component carrier.

When the user equipment under consideration has not received primary component carrier only scheduling, the method can include, at 380, determining whether at least one secondary component carrier has been scheduled.

When the user equipment under consideration has not received primary component carrier only scheduling from the primary component carrier, the method can additionally include, at 390, spatial bundling of acknowledgement and negative acknowledgement bits for the first and second codeword per component carrier only on a per need basis.

The method illustrated in FIG. 3 may be variously implemented. For example, the method of FIG. 3 may be implemented completely in hardware. Alternatively, a computer readable medium, such as a storage medium or non-transitory medium, can be encoded with instructions that, when executed in hardware, perform the method of FIG. 3, or some part of the method shown there. Other steps not illustrated in FIG. 3 may also be performed by the execution of the instructions. The method of FIG. 3 may be performed by a user equipment or by some other network element. For example, the method of FIG. 3 may be performed by the apparatus 200 illustrated in FIG. 2.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

What is claimed is:

1. A method, comprising:
   determining that channel selection and constellation selection are in use or to be used;
   determining that a single mapping table design for channel selection for up to four bits is in use or to be used, wherein the mapping table for n+1 acknowledgment, negative acknowledgment and/or discontinuous transmission bits includes the entries in the table for n acknowledgment, negative acknowledgment and/or discontinuous transmission bits, where n is an integer number of bits from 1 to 3; and
   selecting a communication resource from resource entries corresponding to acknowledgment and negative acknowledgment states based on the determining that channel selection and constellation selection are in use or to be used and the determining that the single mapping table design for channel selection for up to four bits is in use or to be used.

2. The method of claim 1, further comprising:
   determining that carrier aggregation is in use or to be used, wherein the selecting the communication resource is further based on the determining that carrier aggregation is in use or to be used.

3. The method of claim 1, further comprising:
   determining that spatial bundling of acknowledgement and negative acknowledgement bits for the first and second codeword is in use or to be used, wherein the selecting the communication resource is further based on the determining that carrier aggregation is in use or to be used.

4. The method of claim 1, further comprising:
   determining, for a plurality of user equipment, whether primary component carrier only scheduling has been used; and
   selecting channels for the plurality of user equipment on a per user equipment basis,
   wherein selection of the channels is performed on the per user equipment basis depending on whether the user equipment under consideration has received primary component carrier only scheduling.

5. The method of claim 4, further comprising:
   when the user equipment under consideration has received primary component carrier only scheduling, reserving a special signaling state to distinguish between a negative acknowledgment and discontinuous transmission on the primary component carrier.

6. The method of claim 4, further comprising:
   when the user equipment under consideration has not received primary component carrier only scheduling, determining whether at least one secondary component carrier has been scheduled.

7. The method of claim 4, further comprising:
   when the user equipment under consideration has not received primary component carrier only scheduling from the primary component carrier, spatial bundling of acknowledgement and negative acknowledgement bits for the first and second codeword per component carrier only on a per need basis.

8. An apparatus, comprising:
   at least one memory including computer program code; and
   at least one processor,
   wherein the at least one memory and the computer program code are configured to, with the at least one processor, cause the apparatus at least to
   determine that channel selection and constellation selection are in use or to be used;
   determine that a single mapping table design for channel selection for up to four bits is in use or to be used, wherein the mapping table for n+1 acknowledgment, negative acknowledgment and/or discontinuous transmission bits includes the entries in the table for n acknowledgment, negative acknowledgment and/or discontinuous transmission bits, where n is an integer number of bits from 1 to 3; and
   select a communication resource from resource entries corresponding to acknowledgment and negative acknowledgment states based on the determination that channel selection and constellation selection are in use or to be used and the determination that the single mapping table design for channel selection for up to four bits is in use or to be used.

9. The apparatus of claim 8, wherein the at least one memory and the computer program code is configured to, with the at least one processor, cause the apparatus at least to determine that carrier aggregation is in use or to be used, wherein the selection of the communication resource is further based on the determination that carrier aggregation is in use or to be used.

10. The apparatus of claim 8, wherein the at least one memory and the computer program code is configured to, with the at least one processor, cause the apparatus at least to determine that spatial bundling of acknowledgement and negative acknowledgement bits for the first and second codeword is in use or to be used, wherein the selection of the communication resource is further based on the determination that carrier aggregation is in use or to be used.

11. The apparatus of claim 8, wherein the at least one memory and the computer program code is configured to, with the at least one processor, cause the apparatus at least to
    determine, for a plurality of user equipment, whether primary component carrier only scheduling has been used; and
    select channels for the plurality of user equipment on a per user equipment basis,
    wherein selection of the channels is performed on the per user equipment basis depending on whether the user equipment under consideration has received primary component carrier only scheduling.

12. The apparatus of claim 11, wherein the at least one memory and the computer program code is configured to, with the at least one processor, cause the apparatus at least to, when the user equipment under consideration has received primary component carrier only scheduling, reserve a special signaling state to distinguish between a negative acknowledgment and a discontinuous transmission on the primary component carrier.

13. The apparatus of claim 11, wherein the at least one memory and the computer program code is configured to, with the at least one processor, cause the apparatus at least to, when the user equipment under consideration has not received primary component carrier only scheduling, determine whether at least one secondary component carrier has been scheduled.

14. The apparatus of claim 11, wherein the at least one memory and the computer program code is configured to, with the at least one processor, cause the apparatus at least to, when the user equipment under consideration has not received primary component carrier only scheduling from the primary component carrier, spatial bundle of acknowledgement and negative acknowledgement bits for the first and second codeword per component carrier only on a per need basis.

15. A non-transitory computer readable medium encoded with instructions that, when executed in hardware, perform a process, the process comprising:
    determining that channel selection and constellation selection are in use or to be used;
    determining that a single mapping table design for channel selection for up to four bits is in use or to be used, wherein the mapping table for n+1 acknowledgment, negative acknowledgment and/or discontinuous transmission bits includes the entries in the table for n acknowledgment, negative acknowledgment and/or discontinuous transmission bits, where n is an integer number of bits from 1 to 3; and
    selecting a communication resource from resource entries corresponding to acknowledgment and negative acknowledgment states based on the determining that channel selection and constellation selection are in use or to be used and the determining that the single mapping table design for channel selection for up to four bits is in use or to be used.

16. The non-transitory computer readable medium of claim 15, the process further comprising:
    determining that carrier aggregation is in use or to be used, wherein the selecting the communication resource is further based on the determining that carrier aggregation is in use or to be used.

17. The non-transitory computer readable medium of claim 15, the process further comprising:
    determining that spatial bundling of acknowledgement and negative acknowledgement bits for the first and second codeword is in use or to be used, wherein the selecting the communication resource is further based on the determining that carrier aggregation is in use or to be used.

18. The non-transitory computer readable medium of claim 15, the process further comprising:
    determining, for a plurality of user equipment, whether primary component carrier only scheduling has been used; and
    selecting channels for the plurality of user equipment on a per user equipment basis,
    wherein selection of the channels is performed on the per user equipment basis depending on whether the user equipment under consideration has received primary component carrier only scheduling.

19. The non-transitory computer readable medium of claim 18, the process further comprising:
    when the user equipment under consideration has received primary component carrier only scheduling, reserving a special signaling state to distinguish between a negative acknowledgment and discontinuous transmission on the primary component carrier.

20. The non-transitory computer readable medium of claim 18, the process further comprising:
    when the user equipment under consideration has not received primary component carrier only scheduling, determining whether at least one secondary component carrier has been scheduled.

21. The non-transitory computer readable medium of claim 18, the process further comprising:
    when the user equipment under consideration has not received primary component carrier only scheduling from the primary component carrier, spatial bundling of acknowledgement and negative acknowledgement bits for the first and second codeword per component carrier only on a per need basis.

* * * * *